(12) United States Patent
Dames

(10) Patent No.: US 7,590,316 B2
(45) Date of Patent: Sep. 15, 2009

(54) OPTICAL SWITCH

(75) Inventor: Andrew Nicholas Dames, Cambridge (GB)

(73) Assignee: Polatis Limited, Cambridge (GB)

( * ) Notice: Subject to any disclaimer, the term of this patent is extended or adjusted under 35 U.S.C. 154(b) by 0 days.

(21) Appl. No.: 12/066,339

(22) PCT Filed: Sep. 14, 2006

(86) PCT No.: PCT/GB2006/003398

§ 371 (c)(1),
(2), (4) Date: Jun. 20, 2008

(87) PCT Pub. No.: WO2007/031749

PCT Pub. Date: Mar. 22, 2007

(65) Prior Publication Data

US 2008/0253715 A1 Oct. 16, 2008

(30) Foreign Application Priority Data

Sep. 14, 2005 (GB) ................................. 0518732.3

(51) Int. Cl.
*G02B 6/26* (2006.01)
*G02B 6/28* (2006.01)
*G02B 6/34* (2006.01)

(52) U.S. Cl. ............................. 385/18; 385/15; 385/16; 385/17; 385/24; 385/31; 385/36; 385/46

(58) Field of Classification Search ............. 385/15–18, 385/24, 31, 36, 46
See application file for complete search history.

(56) References Cited

U.S. PATENT DOCUMENTS

| | | | |
|---|---|---|---|
| 4,657,339 A | 4/1987 | Fick | |
| 4,896,935 A | 1/1990 | Lee | |
| 5,436,986 A | 7/1995 | Tsai | |
| 6,005,998 A | 12/1999 | Lee | |
| 6,256,429 B1 | 7/2001 | Ehrfeld et al. | |
| 6,335,993 B1 | 1/2002 | Takahashi | |
| 6,415,069 B1 * | 7/2002 | Chao et al. | 385/16 |
| 6,445,842 B1 | 9/2002 | Dhuler et al. | |
| 6,449,407 B1 | 9/2002 | Kiang et al. | |
| 6,456,751 B1 | 9/2002 | Bowers et al. | |
| 6,535,311 B1 * | 3/2003 | Lindquist | 398/82 |
| 6,567,574 B1 * | 5/2003 | Ma et al. | 385/16 |
| 6,658,177 B1 | 12/2003 | Chertkow | |
| 6,859,120 B2 | 2/2005 | Sweatt et al. | |
| 6,859,675 B1 | 2/2005 | Kim | |

(Continued)

FOREIGN PATENT DOCUMENTS

CA 2 386 309 A1 11/2003

(Continued)

*Primary Examiner*—Charlie Peng
*Assistant Examiner*—Hung Lam
(74) *Attorney, Agent, or Firm*—Workman Nydegger

(57) ABSTRACT

An optical switch, comprises: a plurality of N input ports (2); a plurality of M output ports (24); and a plurality of displaceable beam steering arrangements (1) which, during switching, displace; N being greater or equal to 3 while M is greater or equal to 2; the plural number of displaceable arrangements substantially corresponding to either N or M; wherein said displaceable arrangements displace to and from positions of interception of substantially entire beams originating from said input ports and direct said beam on a path to said output port.

29 Claims, 12 Drawing Sheets

U.S. PATENT DOCUMENTS

| | | |
|---|---|---|
| 7,106,925 B2 | 9/2006 | Dames et al. |
| 2002/0003919 A1 | 1/2002 | Morimoto |
| 2003/0072520 A1 | 4/2003 | Wu et al. |
| 2003/0142900 A1* | 7/2003 | Laor et al. .................... 385/18 |
| 2004/0264846 A1 | 12/2004 | Nakata et al. |
| 2005/0018958 A1* | 1/2005 | Huang et al. .................. 385/18 |

FOREIGN PATENT DOCUMENTS

| | | |
|---|---|---|
| EP | 0 496 224 A2 | 7/1992 |
| EP | 1 143 283 A2 | 10/2001 |
| JP | 58-72108 | 4/1983 |
| JP | 2001-350105 | 12/2001 |
| JP | 2004-287124 | 10/2004 |
| WO | WO 01/50176 A1 | 7/2001 |
| WO | WO 01/67159 A2 | 9/2001 |
| WO | WO 02/43432 A1 | 5/2002 |
| WO | WO 2004/064260 A2 | 7/2004 |

* cited by examiner

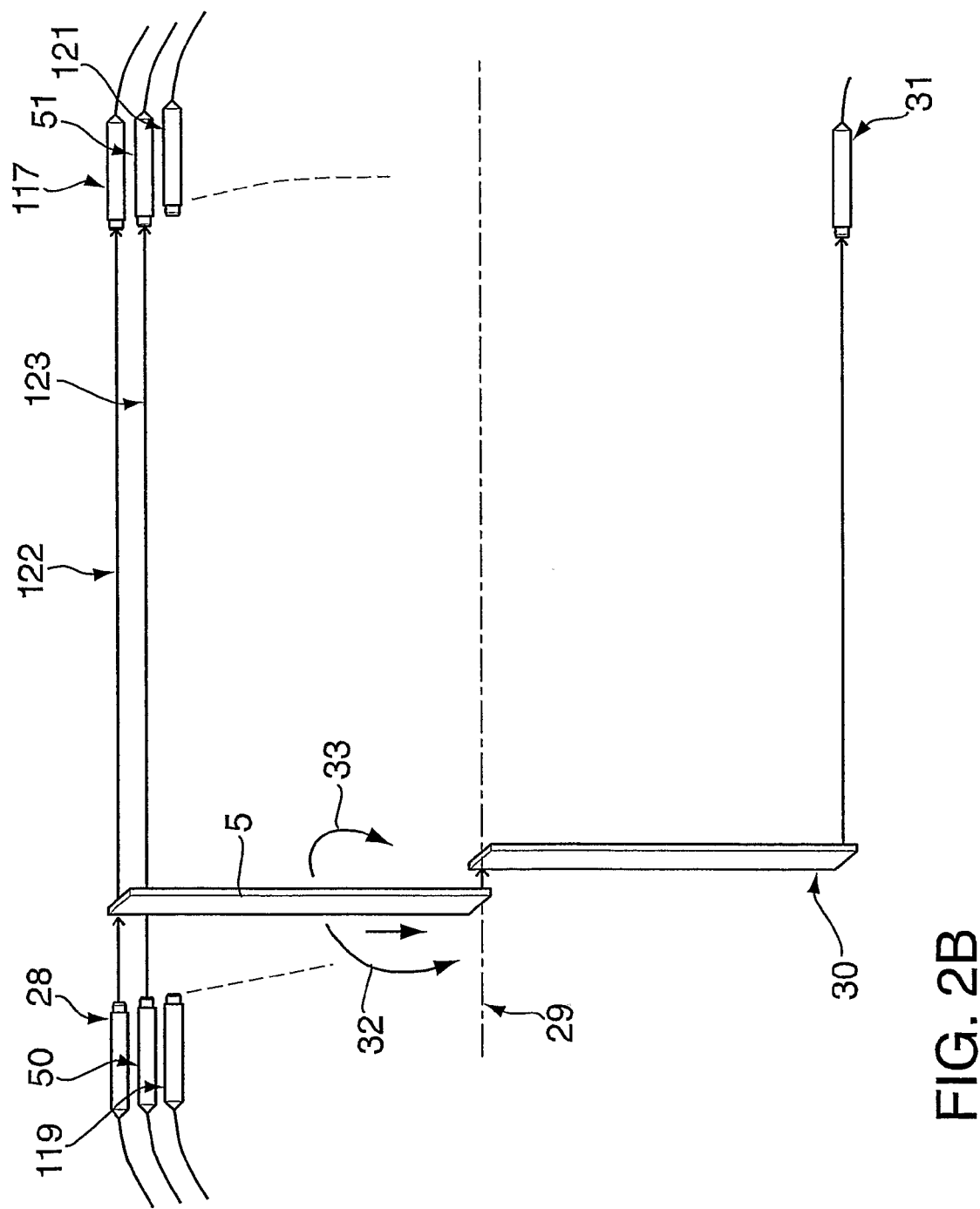

OPTICAL SWITCH

FIELD OF THE INVENTION

The invention relates to optical switches and in particular to optical switches with a plurality of input and output ports with a number of displaceable optical beam steering arrangements to effect switching between input and output ports.

BACKGROUND TO THE INVENTION AND PRIOR ART KNOWN TO THE APPLICANT(S)

There are several categories of prior art which constitute the relevant background to the invention.

The first category of prior art is concerned with switches comprising only one displaceable beam steering arrangement facing a plurality of fixed output ports. Many examples of this category of switches exist, for example: U.S. Pat. No. 6,335,993B1(Takahashi) where the single mobile collimator is fixed to a disk rotating about a central axis; U.S. Pat. No. 4,896,935(Lee) where a single displaceable collimator is rotatable to point towards a series of radially extending collimators; and U.S. Pat. No. 657,339(Fick) where a single displaceable fibre through a contraction of a one-dimensional piezo electric arrangement allows the fibre to bend in between two positions where fixed fibres are located. Other examples in this category may be structures with a single fixed input port and multiple fixed output ports with a single optical element displaced to achieve switching such as JP2004287124(Nin Sensho) and CA2002386309(Sun De-Gui).

Further examples with a single displaceable beam steering arrangement are shown in US2003/0072520(Wu et al); JP58072108(Matsui); and U.S. Pat. No. 5,436,986(Tsai). EP0496224A2 may also be included in this category since it shows a single two part optical switch whose lenses are displaced through the action of a single actuator. The displacement of the lenses occurs simultaneously with the displacement of the displaceable beam steering arrangement.

A second category of prior art exists which shows multiple input and output switches with a number of actuators equaling the total number of ports. In other words, these often require the input and the output ports to be displaceable for switching to occur. WO01/50176 (Polatis), U.S. Pat. No. 6,256,429 (Ehrfeld et al), WO02/43432 (Arol) and U.S. Pat. No. 6,005,998 (Lee) show at least one actuator per port. In other words, for a total of M+N ports there are provided at least M+N actuators to displace optical elements. U.S. Pat. No. 6,859,120 (Sweatt William et al) also shows a system using actuators on both the input and output side of an optical switch.

A third category of switches relies on the use of at least two displaceable optical elements between fixed arrays of input and output ports. For example, U.S. Pat. No. 6,456,751B1 (Bowers et al) shows the use of two micro-actuated arrays of mirrors. Another example can be found in JP2001350105 where a series of at least two movable prisms is envisaged to switch a beam from one port to another in a multiple input and multiple output switch. This category of switches also requires at least the same number of actuated optical elements as their total number of ports.

A fourth category of switches uses the same number of input or output ports as the number of beam steering arrangements of the switch. US2002/0003919(Morimoto) has the same number of tiltable optical beam steering arrangements as the number of input ports. It fails however to transmit an entire beam from an input port to an output port since the inputs broadcast a fan across all the mirrors which results in large losses. The optical beam steering arrangements therefore fail to substantially intercept entire beams originating from input ports and to subsequently direct a beam on a path to an output port. Furthermore, the displaceable arrangements of the prior art also fail to displace to and from positions of interception of substantially entire beams. They simply are rotatable on the spot with no displacement to and from a location where individual interception may be achieved.

SUMMARY OF THE INVENTION

In a first broad independent aspect, the invention provides an optical switch comprising: a plurality of N input ports; a plurality of M output ports; and a plurality of displaceable beam steering arrangements which, during switching, displace; N being greater or equal to 3 whilst M is greater or equal to 2; the plural number of displaceable arrangements substantially corresponding to either N or M; wherein said displaceable arrangements displace to and from positions of interception of substantially entire beams originating from said input ports and direct said beam on a path to said output port.

This structure allows switches which are equal or greater than 3×2 switches to employ only N or M displaceable arrangements which reduces the number of actuators required whilst low levels of cross-switch losses may be achieved. Reducing the displaceable components also allows greater compactness and cost efficiency to be achieved. The control systems will also be simplified as a result of this combination of features.

In a subsidiary aspect, the beam steering arrangement comprises a first reflective arrangement which intercepts a beam from an input port and directs a beam towards a second reflective arrangement which intercepts a beam exiting from a first reflective arrangement and directs a beam to an output port; wherein said first and second reflective arrangements are displaceable. This configuration is particularly advantageous because it allows high quality switching to be achieved from multiple input and output systems with greater compactness particularly when compared to switches having one actuator per port.

In a further subsidiary aspect, said beam steering arrangement comprises a first reflective arrangement which intercepts a beam from an input port and directs a beam towards a second reflective arrangement which intercepts a beam exiting from a first reflective arrangement and directs a beam to an output port; wherein said first reflective arrangement is displaceable and said second reflective arrangement is fixed, during switching. This further improves the accuracy of the switch.

In a further subsidiary aspect, a plurality of pairs of first and second reflective arrangements are provided to direct a beam from a selected input port to a selected output port.

In a further subsidiary aspect, said displaceable beam steering arrangement is a reflective arrangement which in a first mode of displacement, is retractable from the optical path of light exiting, in use, from a first input; and, in a second mode of displacement, said reflective arrangement is displaceable into a position to receive light from a further input port without during its displacement interfering with other ports of said input ports located between said first port and said further port. This is particularly advantageous because it avoids interrupting other established paths during switching. It therefore allows the switch to be "hitless".

In a further subsidiary aspect, the input ports are spaced about an arc; said reflective arrangement being retractable substantially radially, in said first mode of displacement, and rotatable, in said second mode of displacement, between said first port and said further port. This configuration avoids interrupting established paths in a repeatable, reliable and accurate manner.

In a further subsidiary aspect, said reflective arrangement is a periscope arrangement. This allows the switch to be accurate and reliable whilst at the same time being particularly compact.

In a further subsidiary aspect, said reflective arrangement incorporates a periscope prism which is an example of a bulk optical element which achieves the required optical quality and lends itself to relatively straightforward replacement if necessary as well as allowing the switch's scale to be readily increased.

In a further subsidiary aspect, said reflective arrangement is mounted radially on a rotatable mount through flexure means; and the switch further comprises an actuator which causes said periscope arrangement to be radially displaceable against the resilience of said flexure means. This allows minimal actuator displacements to achieve relatively large reflective arrangement displacements in an improved efficient manner.

In a further subsidiary aspect, the actuator is an elongate piezo-electric actuator which is at one end secured to said mount and at its displaceable opposite end connected to said periscope arrangement by flexure means. This configuration is particularly advantageous because it allows the switch to be particularly compact.

In a further subsidiary aspect, said periscope arrangement is equipped with a projection which is located between two abutments of said mount in order to limit the displacement of said periscope arrangement.

In a further subsidiary aspect, said reflective arrangement is a periscope arrangement with an upper reflective face, a lower reflective face and an intermediate reflector; and an attached adjacent second periscope arrangement arranged to receive a beam reflected of said first periscope arrangement.

In a further subsidiary aspect, said intermediate reflector is a partial reflector.

In a further subsidiary aspect, the switch incorporates pairs of periscope arrangements; one of which is rotatable and the other one of which is fixed.

In a further subsidiary aspect, the switch incorporates pairs of periscope arrangements; both of which are independently rotatable. This allows the switch to be more versatile than other configurations defined in preceding aspects.

In a further subsidiary aspect, said displaceable arrangements incorporate a first reflective arrangement with an upper and a lower reflective face which are separated by a first distance; and a second reflective arrangement with an upper and a lower reflective face which are separated by a second distance; the second distance being lower than the first distance. This allows the output or input ports to be place on a plurality of lines whereby a greater number of ports may be provided on a given switch side.

In a further subsidiary aspect, the ports are arranged as part of a plurality of arcs with at least one arc located within an outer arc.

In a further subsidiary aspect, the or each input port inward most extremity terminates in an optical element such as a collimator which is fixed during switching and the or each output port inward most extremity terminates in an optical element such as a collimator which is displaced by a beam steering arrangement.

In a further broad independent aspect, the invention provides a plurality of input ports and a plurality of output ports; a first reflective arrangement for capturing a beam from an input port and directing a beam towards a second reflective arrangement for capturing a beam exiting from said first reflective arrangement and directing a beam to an output port; wherein said first reflective arrangement is displaceable and incorporates a first periscope arrangement with an upper reflective face, a lower reflective face and an intermediate reflector; and an attached adjacent second periscope arrangement arranged to receive a beam reflected of said first periscope arrangement.

In a further subsidiary aspect, said intermediate reflector is a partial reflector.

In a further broad independent aspect, the invention provides an optical switch comprising: a plurality of input ports N; a plurality of output ports M; and a plurality of displaceable beam steering arrangements which displace, during switching, without the input and output port displacing; N being greater or equal to 3 whilst M is greater or equal to 2; wherein said displaceable arrangements displace to and from positions of interception of substantially entire beams originating from said input ports and direct said beam on a path to said output port.

BRIEF DESCRIPTION OF THE FIGURES

FIG. 2*b* shows the retractable prism of FIG. 2*a* in its intercepting position.

DETAILED DESCRIPTION OF THE FIGURES

Figure 1B:
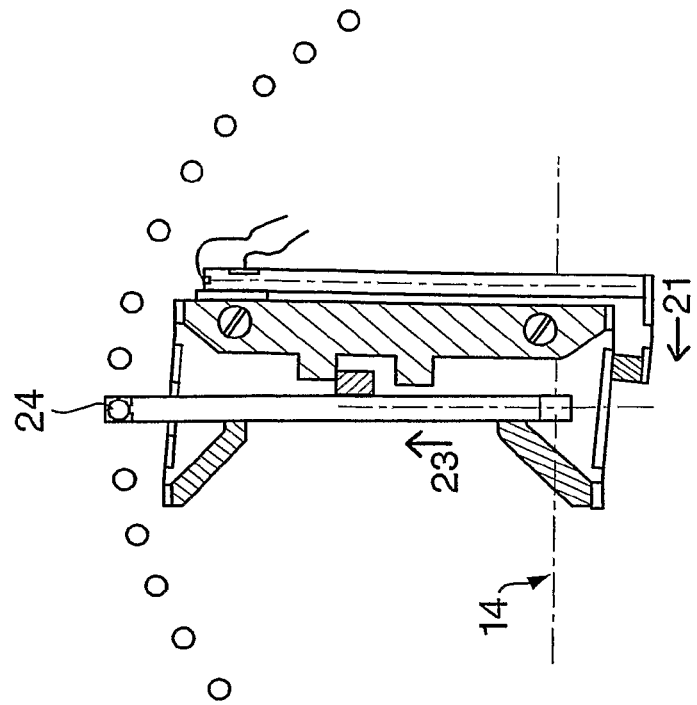
FIG. 1*b* shows a similar view to FIG. 1*a* with the prism in a position for intercepting light emitted by a corresponding port.
Figure 1A:
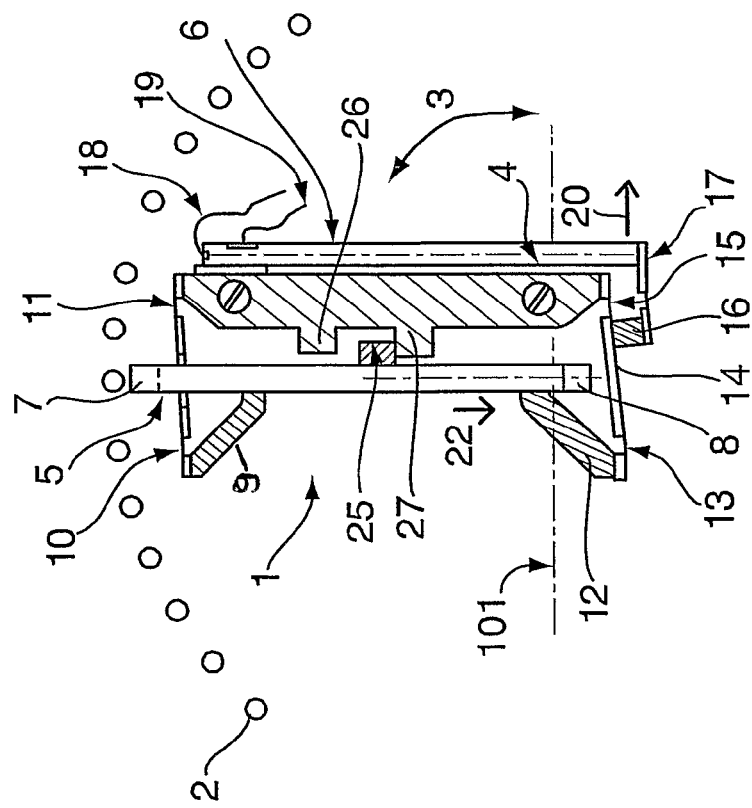
FIG. 1*a* shows a front elevation of a displaceable optical beam steering arrangement with a portion of input ports in a position where the prism is retracted from the optical path of a corresponding port.

FIG. 1*a* shows a beam steering arrangement 1, which is one of a plurality of such beam steering arrangements. Beam steering arrangement 1 is shown in a front elevation view with a number of input collimators 2 which are the inner most extremities of the ports. In this description the terms input ports and output ports may often be interchanged since when the switch is bi-directional the input port of the switch may act as an output port or an input port dependent upon whether the port functions as an input or an output. The input and output may be designated by the user according to his requirements.

The terms input/output are used without being interchanged throughout the description for clarity. Furthermore, the term port is to be interpreted broadly so that it includes outermost portions and innermost portions. In certain configurations, it is possible that the outermost portions are fixed whilst the innermost portions which may be in the form of collimators are displaceable such as in FIG. 10.

The input ports 2 are arranged and disposed at regular intervals in an arc. In one embodiment, the arc may be a full circle. The invention also envisages embodiments where a number of arcs or circles of different radii may be used in order to maximise the packing of ports on a particular side of the switch. The optical beam steering arrangement may be rotatable in the clockwise and anti-clockwise directions as shown by arrow 3. A beam steering arrangement may rotate about the central longitudinal axis 101 of the switch as appropriate. The rotation of the beam steering arrangement 1 may be provided by any appropriate driving mechanism such as a step motor.

The step motor or other appropriate driving mechanism would transmit rotary controlled movement to mount 4 which carries a reflective arrangement in the form of a periscope prism 5 as well as a piezoelectric actuator 6. Whilst the reflective arrangement shown is a periscope prism other reflective systems may be contemplated such as a periscope formed by an array of mirrors. The periscope prism 5 incorporates an upper diagonal face 7 and a lower diagonal face 8.

The upper portion of the prism is secured to mount 4 through an arm 9 and a series of flexures such as flexures 10 and 11. Space is provided between the prism 5 and the flexures to allow radial displacement of the prism.

At the lower portion of prism 5, there is provided an arm 12 which is secured to the prism. A flexure plate 13 joins motion transmitting means 14 to arm 12. The motion transmitting means may be a rod or a plate which is rigid relative to the flexure means 13. The motion transmitting means 14 is attached to the lower portion of mount 4 through a further flexure 15. A spacer block 16 is provided between motion transmitting means 14 and plate 17 which itself joins the free end of piezoelectric actuator 6.

The piezoelectric actuator may be of a monolithic kind with interleaved layers of piezoelectric material and electrode plates. Examples can be found in the applicant's previous patent disclosure WO2002103816 which is included by reference. This disclosure illustrates 2-D piezoelectric actuators. It is to be understood that a 1-D actuator is preferred in this embodiment.

Two connections 18 and 19 may be used to allow the piezoelectric actuator to be driven in the directions shown by arrows 20 and 21 in FIGS. 1*a* and 1*b*. The two connections to the piezoelectric actuator will need to be of sufficient versatility to accommodate the rotation of mount 4. This may be achieved via a pair of electrically isolated bearings supporting the rotating mount. Alternatively, one connection can be made via the anti-backlash spring which supports the prism or by some other method for example a flexible cable or an arrangement of slip rings.

When actuated, the piezoelectric actuator will bend in either the direction indicated by arrow 20 or in the direction of arrow 21 dependent upon the voltage applied to the driving connections. Due to the space achieved by spacer 16 amplified motion in the upwards and downwards directions as shown by arrows 22 and 23 is achieved.

As can be seen from FIG. 1*b* when the piezoelectric actuator bends towards the side surface of its mount 4, the prism is lifted up towards into a position where it intercepts an optical path in a manner to receive substantially the entire optical beam exiting port 24. Due to the angle of the upper diagonal face 7 the captured beam is then sent towards the lower diagonal face 8 where it is further reflected towards a reflective arrangement which is positioned to guide the beam towards a particular output port.

Projecting laterally from the prism is an end stop 25 which when the prism is either lifted or lowered according to the direction of the piezoelectric actuator will abut against abutment 26 or 27. The end stop 12 allows the correct position for the light from the input column 8 to be taken and moved to the central axis 101 of the switch. It also avoids excessive over travel when the prism is displaced in the direction shown in FIG. 1*a*. This enables the piezoelectric actuator to be driven by a relatively simple on/off voltage without feedback control on the prism position.

Figure 2A:
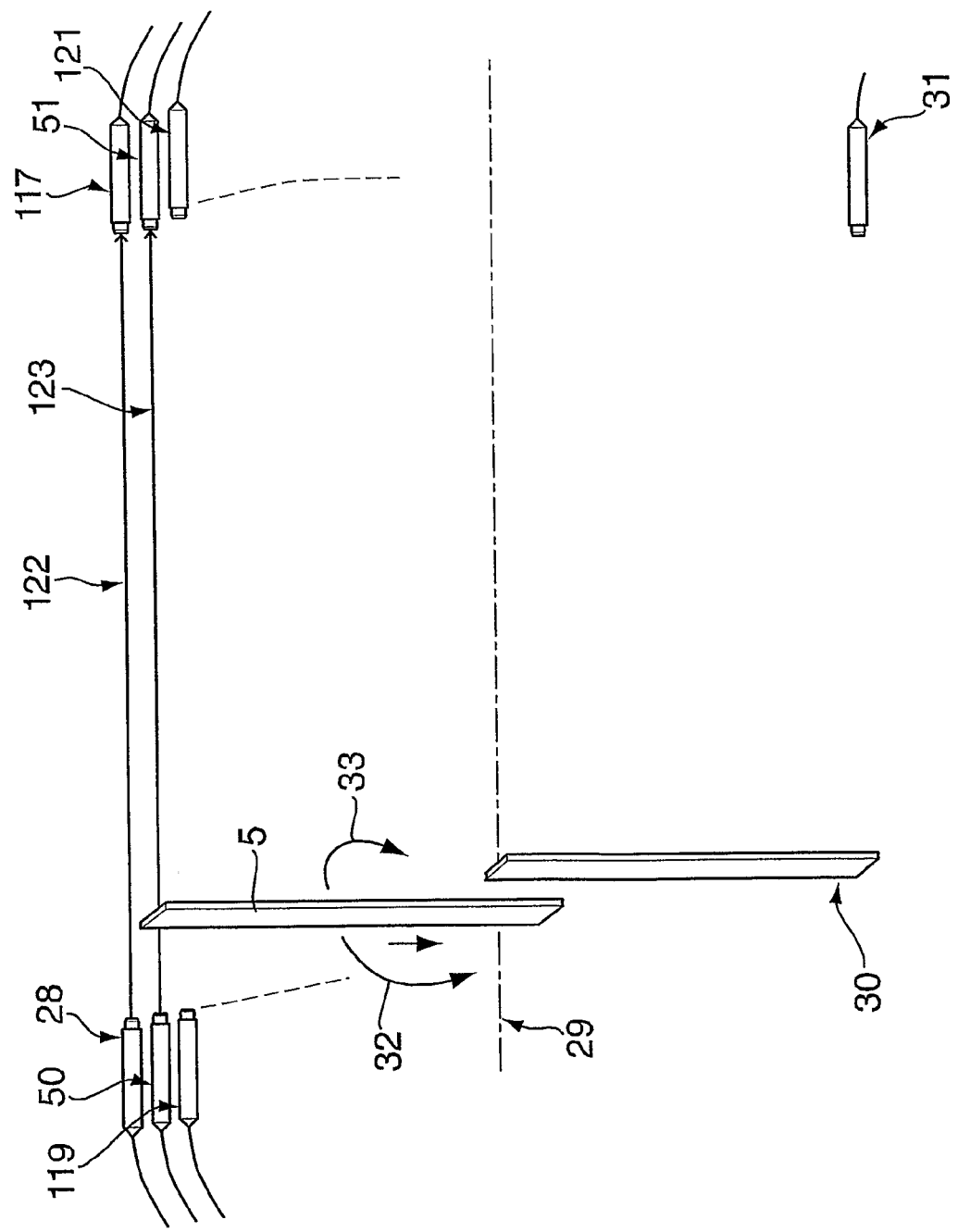
FIG. 2*a* shows a part of an optical switch with a fixed prism and a moveable prism, when the moveable prism is in its retracted position.

FIG. 2*b* shows a simplified version of the switch where prism 5 is in the upper position where it couples light from input collimator 28 onto the central axis 29 of the switch then via the fixed prism 30 to output collimator 31. FIG. 2*a* by contrast shows an embodiment where prism 5 has been withdrawn from a position where it could intercept optical paths emitted by the input or output collimators. In the position of FIG. 2*a*, the prism 5 is free to rotate as indicated by arrows 32 and 33 to any appropriate radius prior to being positioned to intercept the beams emitted from a further port of the switch.

Whilst this embodiment shows the use of pairs of optical elements constituted by a moveable prism and a fixed prism, the invention envisages the use of pairs with a couple of displaceable prisms. The invention also envisages that the prisms may be of differing lengths in order to achieve a greater compactness of ports on at least one side of the switch. The invention also envisages that the number of pairs of prisms substantially equate either the number of the input or output ports.

Figure 3:
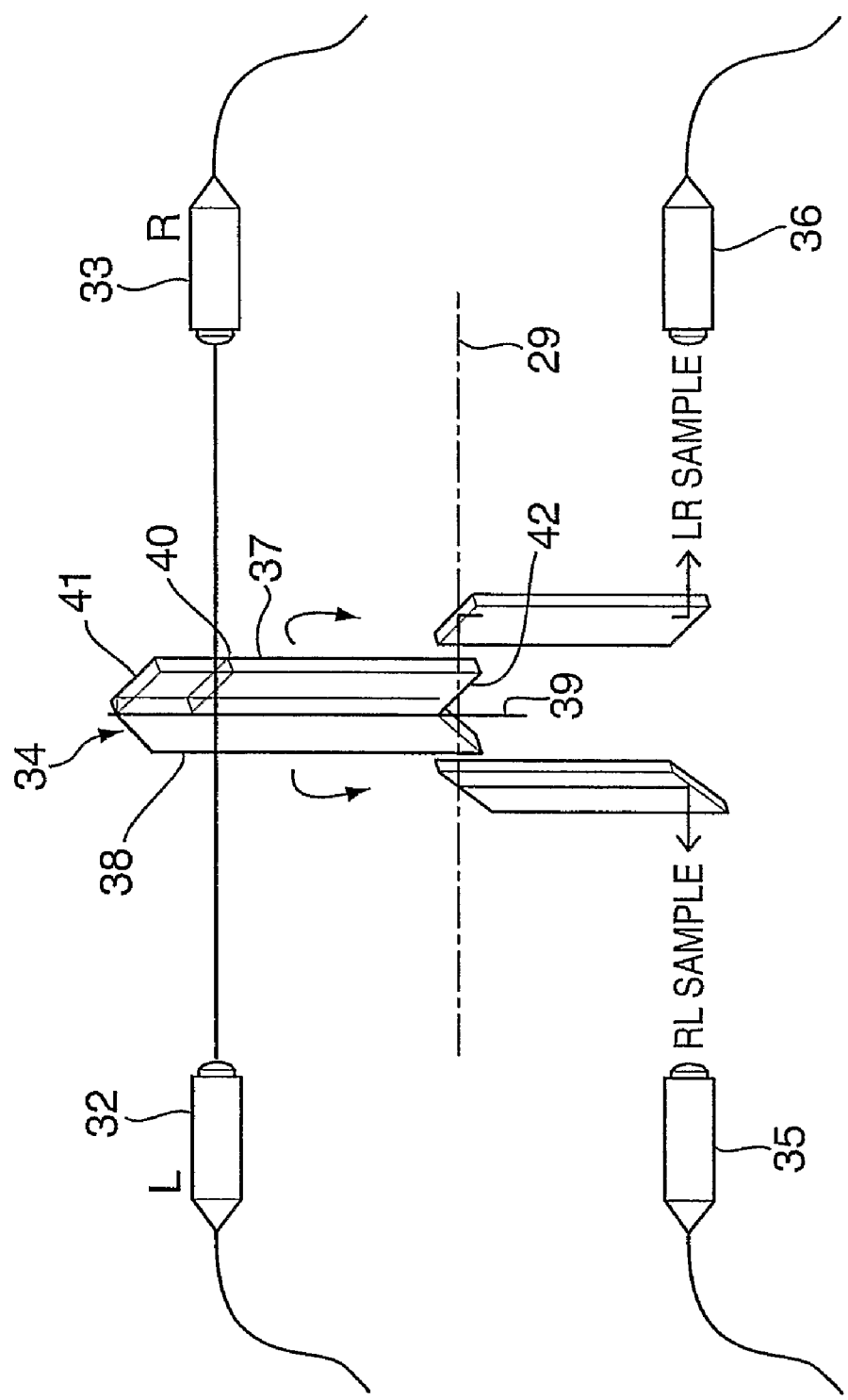
FIG. 3 shows a displaceable double prism beam steering arrangement operating in conjunction with two fixed prisms.

FIG. 3 shows an embodiment of a switch variant where light in both directions between fixed collimators 32 and 33 is captured by the moving double prism arrangement generally referenced 34. The double prism arrangement 34 allows light received to be connected separately to output collimators 35 and 36. The double prism arrangement comprises a first periscope prism 37 and a second periscope prism 38 which is symmetrical relative to prism 37 about the longitudinal axis 39; whilst prism 37 defers from prism 38 since it incorporates an angled facet 40 located between upper facet 41 and lower facet 42. Angled facet 40 can either be a total reflector, for example an air gap of a wavelength or more or a metal or dielectric coated surface or alternatively a partial reflector. In the case of a partial reflector, the switch allows a portion of the light to go between collimators 32 and 33 and a sample is directed to collimators 36 for light between collimator 32 and 33 or collimator 35 for light between collimator 33 and collimator 32. In manufacture, the elements of the double prism arrangement could be made from two parallel glass plates (one being thicker than the other) bonded together with a coating between the plates, before being sawn at 45 degrees into thin plates. Prism 38 would similarly be made into a thicker plate. These would be bonded together before being diced into the final complete assembly as shown in FIG. 3.

Figure 4:
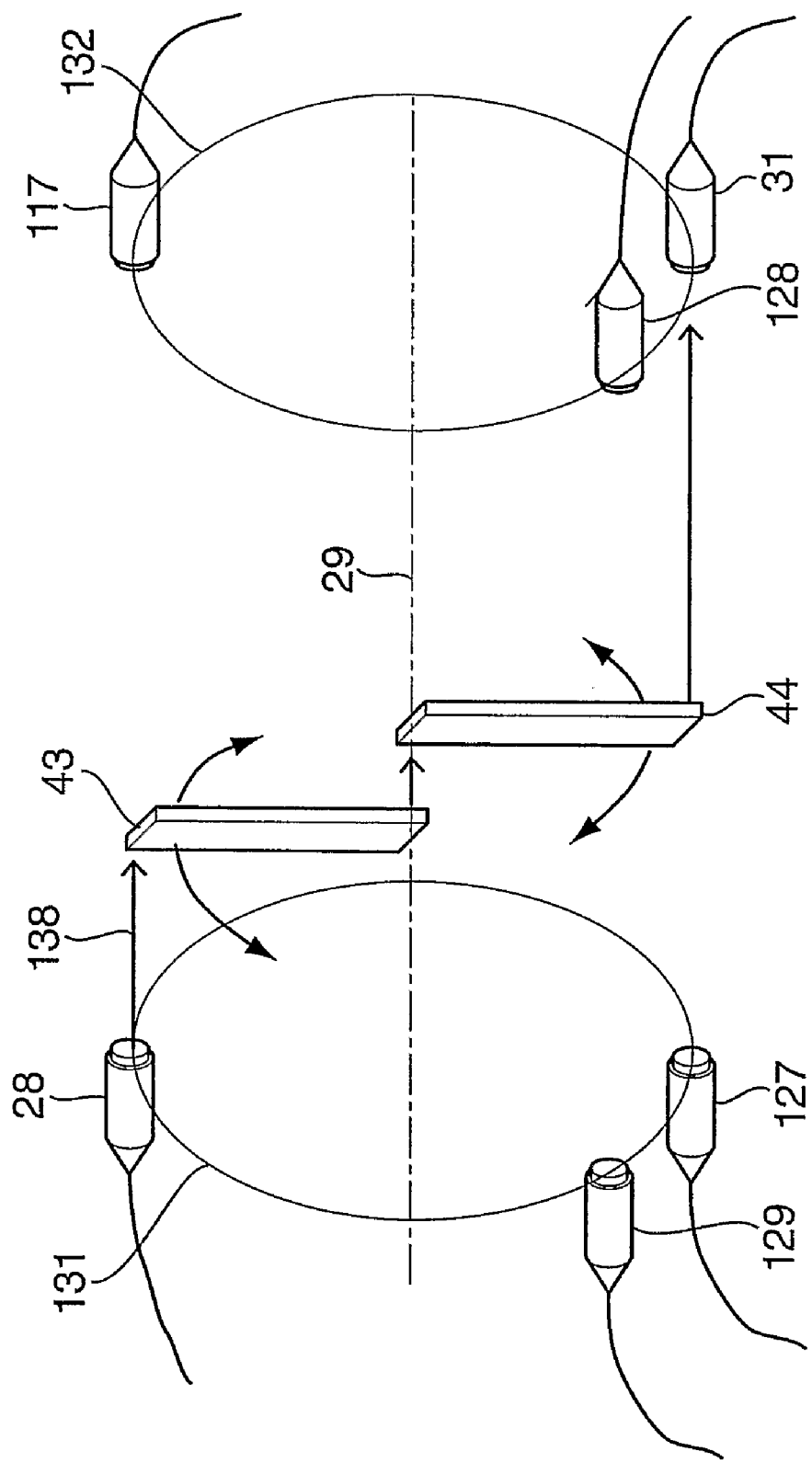
FIG. 4 shows a view of part of a switch with two displaceable beam steering arrangements.

FIG. 4 shows an embodiment where both prisms in the optical path can rotate independently. In this version, the prisms 43 and 44 have the same effective length.

Figure 5:
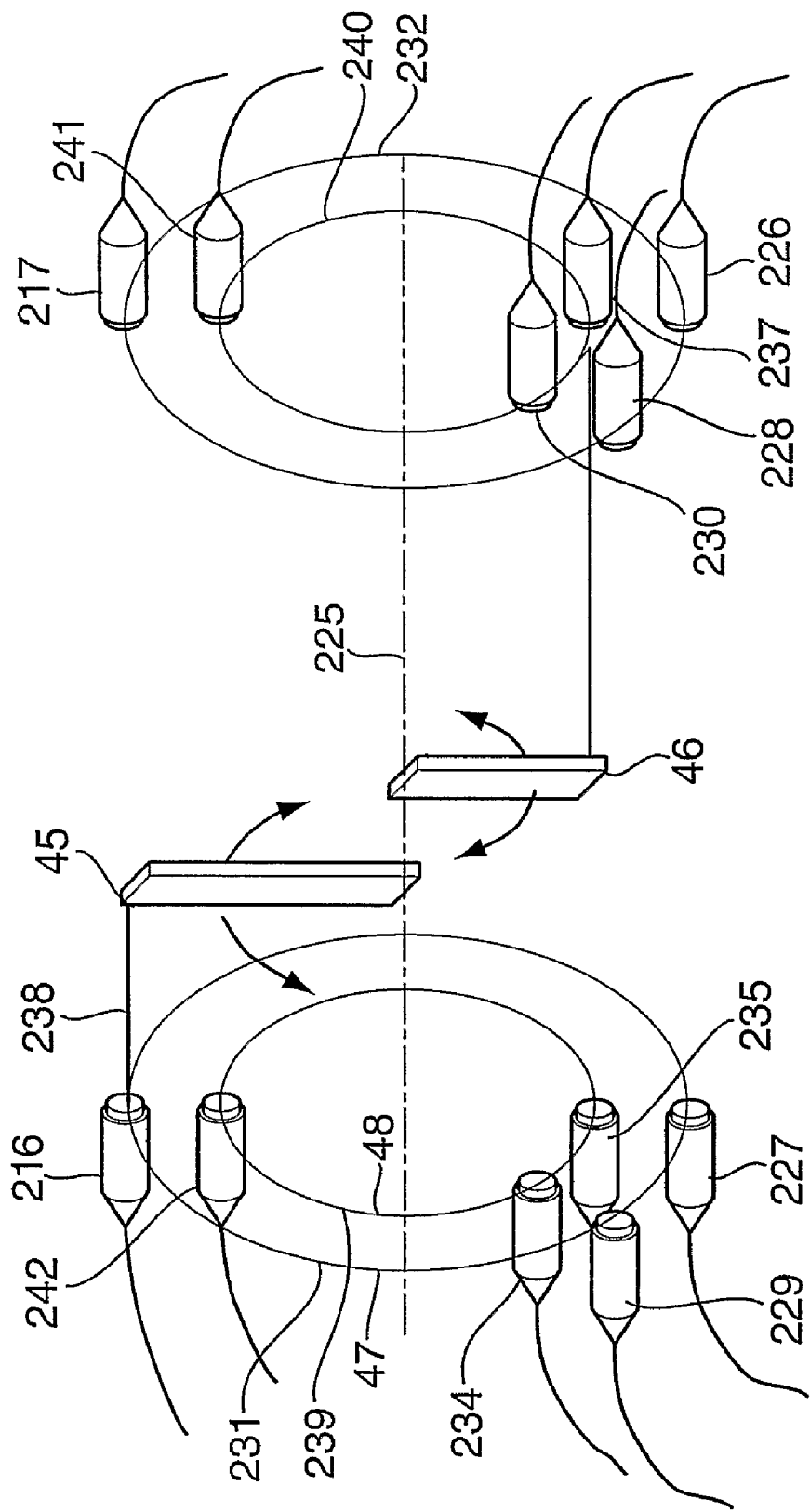
FIG. 5 shows a view of part of a switch with two displaceable beam steering arrangements one of which has a shorter prism than the other.

FIG. 5 shows a further switch with a number of pairs of prisms 45 and 46 which have different lengths whereby a plurality of rings such as ring 47 and 48 may be provided on both sides of the switch.

Figure 6A:
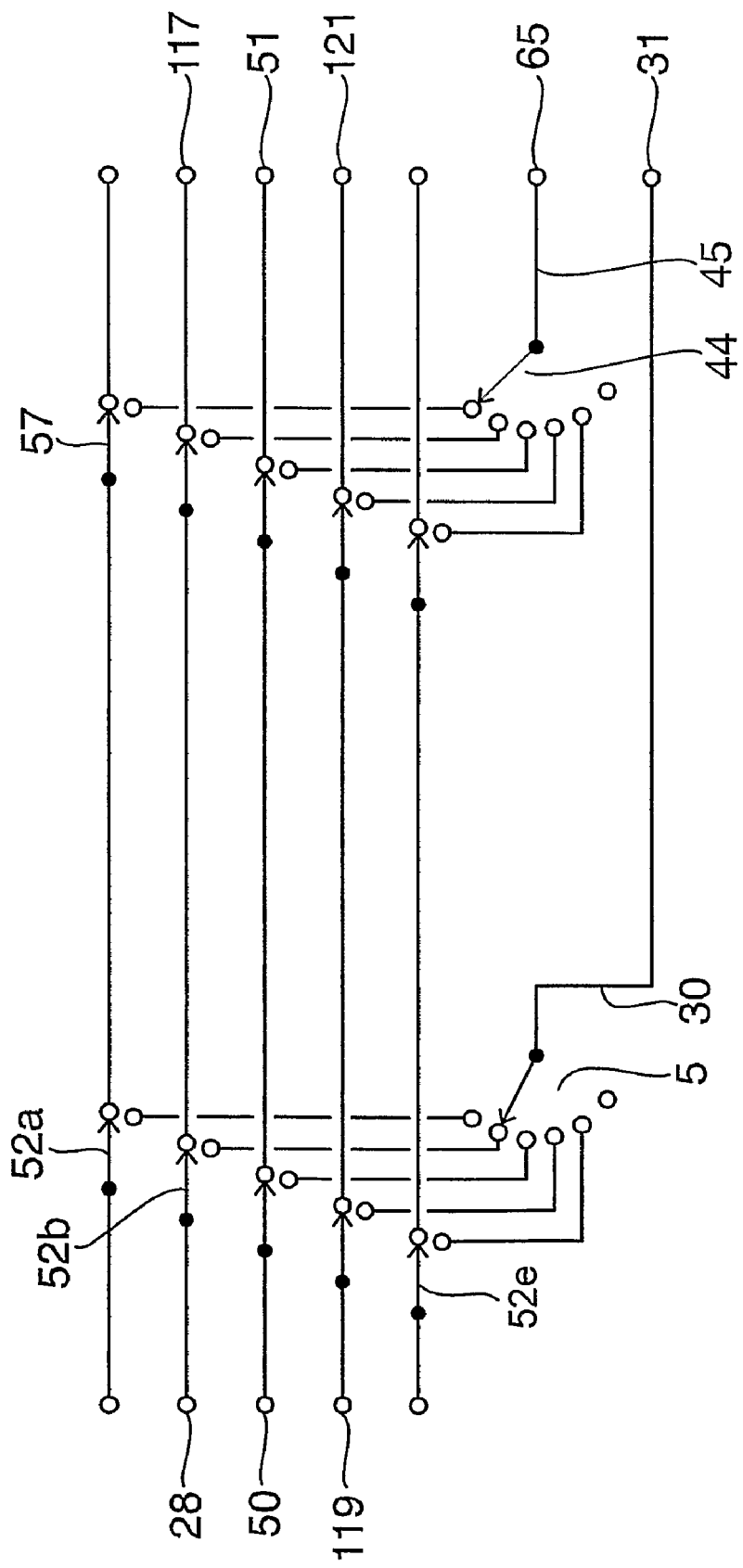
FIG. 6*a* shows the functional switch structure diagram of FIG. 2*a*.
Figure 6B:
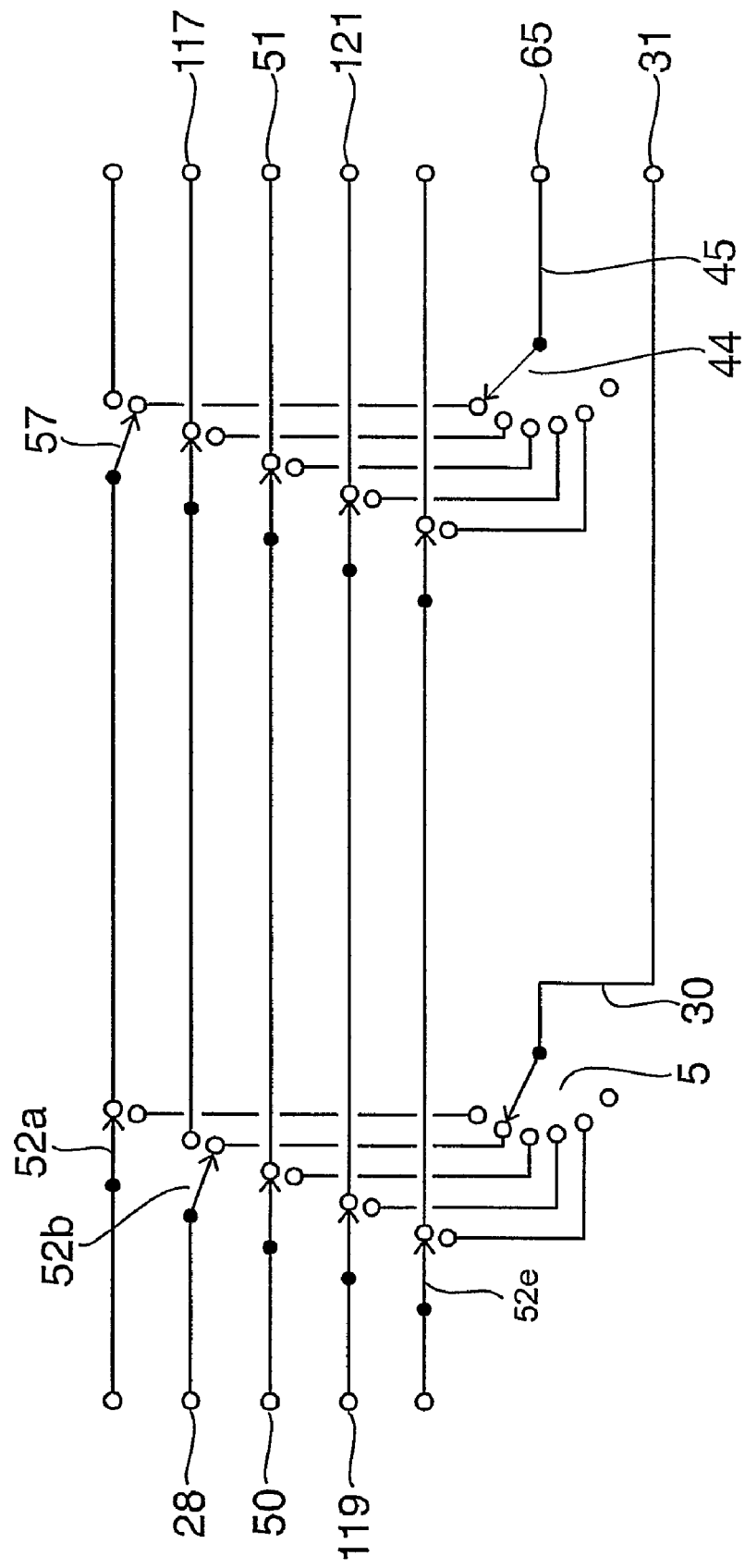
FIG. 6*b* shows the functional switch structure diagram of the switch of FIG. 2*b*.

FIGS. 6*a* and 6*b* show respectively the associated functional switch structure diagrams of the switch of FIGS. 2*a* and 2*b*. In FIG. 6*b*, prism 5 is displaced in order to be in a position to intercept a beam emitted by port 28 and transmitted through fixed prism 30 towards output port 31. If no interception occurs, for example as illustrated by port 50 the light is not intercepted by prism 5 and is transmitted across the switch to output port 51. Switches 52*a* to 52*e* may be set to activate in harmony with the rotation of prism 5 as it sweeps through the beams. Withdrawing the rotating prism 5 may have the effect of disabling the associated bank of implied parasitic switches 52*a* to 52*e* (FIG. 6*a*) as the prism no longer crosses the beams as it rotates.

Figure 7:
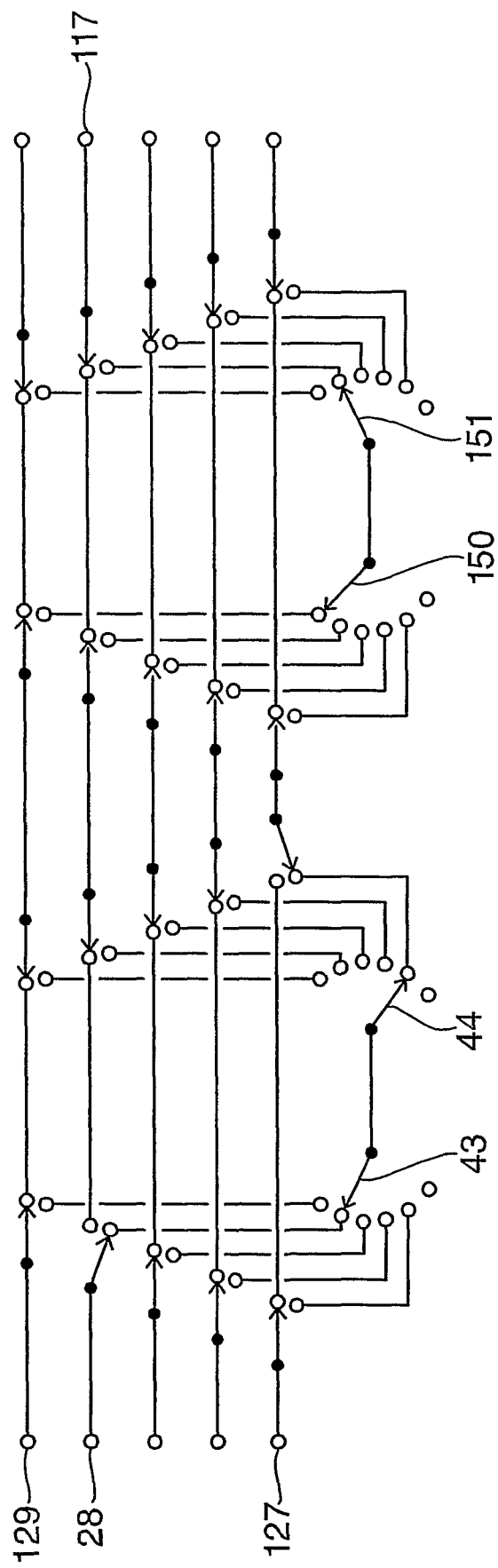
FIG. 7 shows the functional switch structure diagram of the embodiment of FIG. 4.
Figure 8:
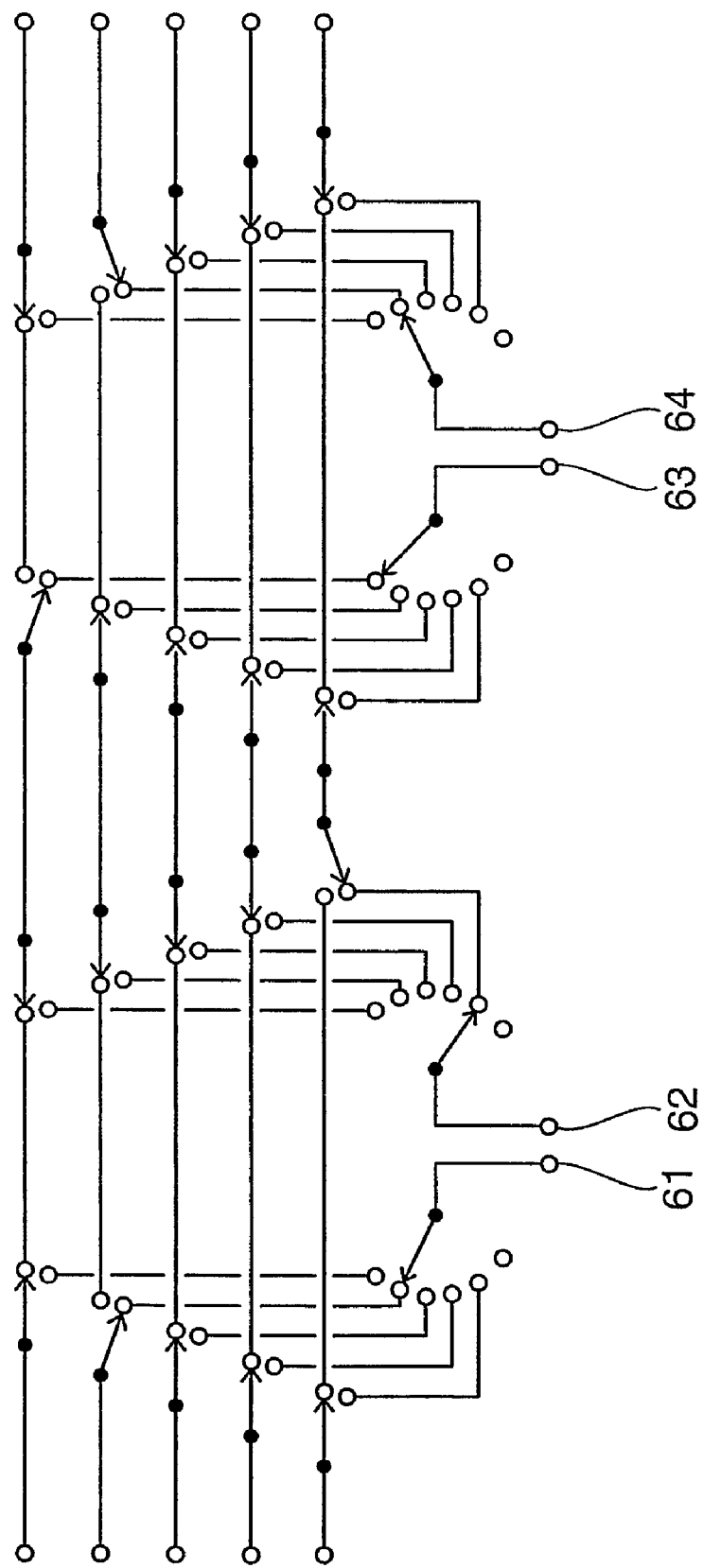
FIG. 8 shows the functional switch structure diagram of the embodiment of fixed prisms inserted between pairs of rotating prisms.

FIG. 7 shows the functional switch structure diagram for FIG. 4. Similarly, FIG. 8 shows the functional switch structure diagram where fixed prisms are inserted between pairs of rotating prisms in order to obtain additional outputs 61, 62, 63 and 64.

Figure 9:
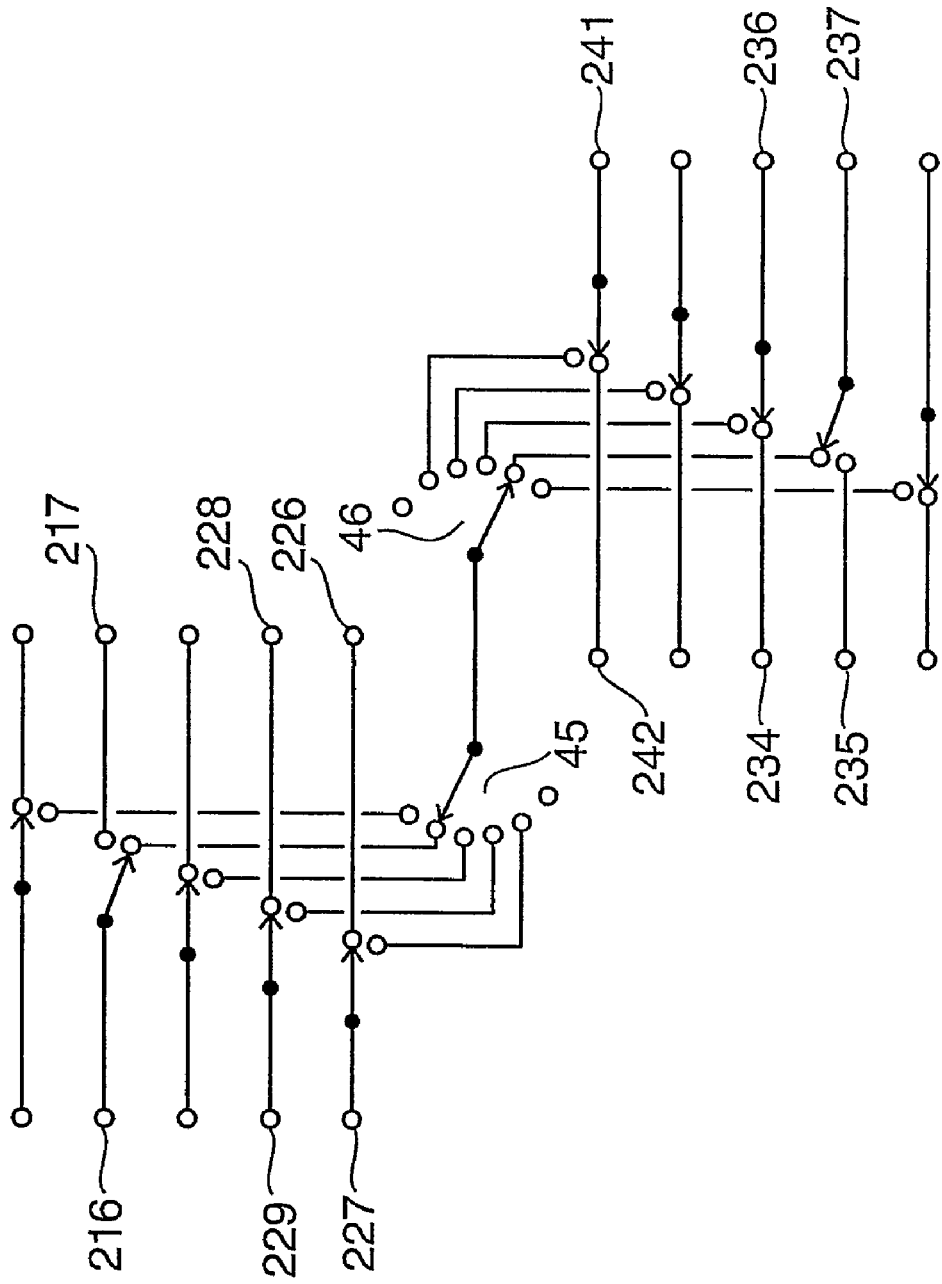
FIG. 9 shows the functional switch structure diagram of the switch of FIG. 5.

FIG. 9 shows the functional switch structure diagram of the switch of FIG. 5. This structure is functionally equivalent to connecting a pair of switches as per FIG. 6*b* together by their main outputs 31 and 65.

Figure 10:
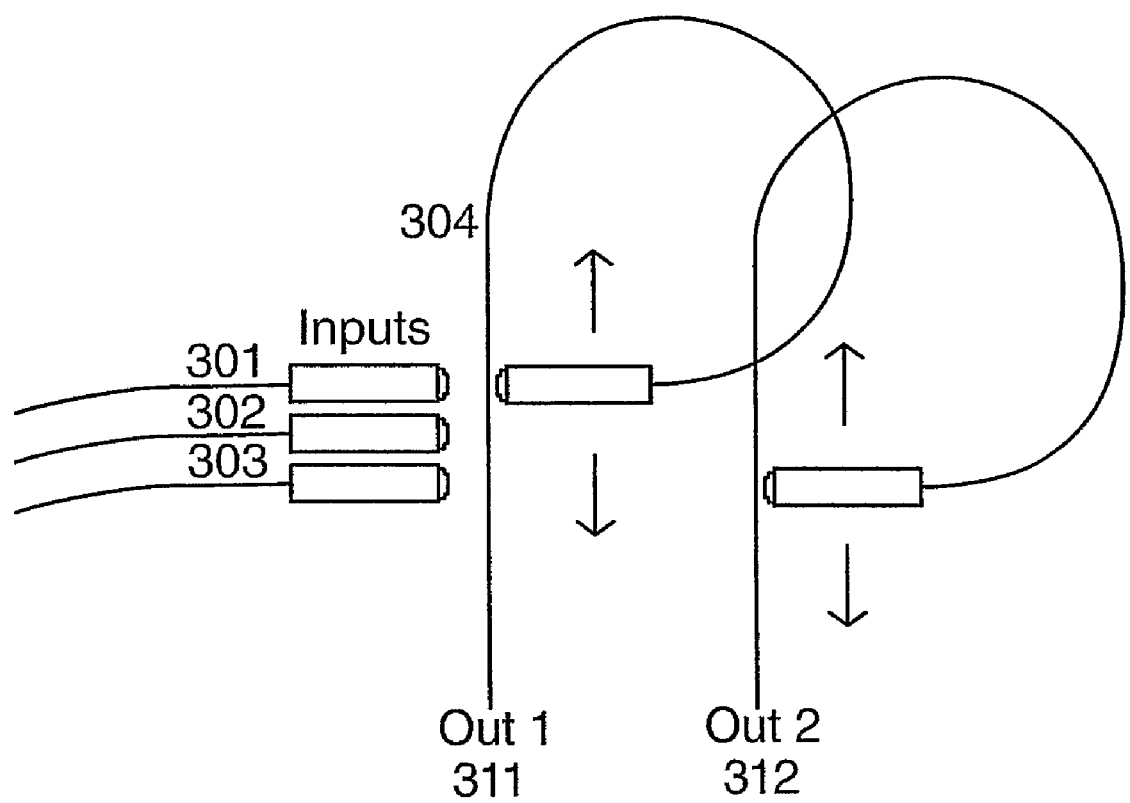
FIG. 10 shows a further embodiment of a switch where the input collimators are fixed and the output collimators are displaceable.

FIG. 10 shows a further embodiment of a switch structure with 3 input ports (301, 302, and 303) and 2 output ports (311, 312). The input ports incorporate in their inward most location a collimator which directs light into the switch across a space 304 towards output collimators such as 311 and 312 which are caused by beam steering arrangements to displace up and down into and from a position in line with an input collimator which allows substantially the entire light from the collimator to be received by an intercepting collimator.

The invention claimed is:

1. An optical switch comprising:
   a plurality of N input ports, N being greater than or equal to 3;
   a plurality of M output ports, M being greater than or equal to 2; and
   a plurality of displaceable beam steering arrangements which, during switching, displace, wherein said displaceable arrangements displace to and from positions of interception of substantially entire beams originating from said input ports and direct said beams on paths to said output ports; wherein each displaceable beam steering arrangement comprises a reflective arrangement which in a first mode of displacement, is retractable from the optical path of light exiting, in use, from a first input port; and, in a second mode of displacement, said reflective arrangement is displaceable into a position to receive light from a further input port without during its displacement interfering with other ports of said input ports located between said first port and said further port.

2. The switch according to claim 1, wherein each reflective arrangement comprises a first reflective arrangement which intercepts a beam from an input port and directs the beam towards a second reflective arrangement which intercepts the beam exiting from the first reflective arrangement and directs the beam to an output port; wherein said first and second reflective arrangements are displaceable.

3. The switch according to claim 1, wherein each reflective arrangement comprises a first reflective arrangement which intercepts a beam from an input port and directs the beam towards a second reflective arrangement which intercepts the beam exiting from the first reflective arrangement and directs the beam to an output port; wherein said first reflective arrangement is displaceable and said second reflective arrangement is fixed, during switching.

4. The switch according to claim 2, wherein a plurality of pairs of first and second reflective arrangements are provided to direct a beam from a selected input port to a selected output port.

5. The switch according to claim 3, wherein a plurality of pairs of first and second reflective arrangements are provided to direct a beam from a selected input port to a selected output port.

6. The switch according to claim 1, wherein the input ports are spaced about an arc; each reflective arrangement being retractable substantially radially, in said first mode of displacement, and rotatable, in said second mode of displacement, between said first port and said further port.

7. The switch according to claim 1, wherein each reflective arrangement is a periscope arrangement.

8. The switch according to claim 7, wherein each reflective arrangement incorporates a periscope prism.

9. The switch according to claim 7, wherein each reflective arrangement is mounted radially on a rotatable mount through a flexure; and the corresponding beam steering arrangement further comprises an actuator which causes said periscope arrangement to be radially displaceable against the resilience of said flexure.

10. The switch according to claim 8, wherein each reflective arrangement is mounted radially on a rotatable mount through a flexure; and the corresponding beam steering arrangement further comprises an actuator which causes said periscope arrangement to be radially displaceable against the resilience of said flexure.

11. The switch according to claim 9, wherein the actuator is an elongate piezo-electric actuator which is at one end secured to said mount and at its displaceable opposite end connected to said periscope arrangement by said flexure.

12. The switch according to claim 10, wherein the actuator is an elongate piezo-electric actuator which is at one end secured to said mount and at its displaceable opposite end connected to said periscope arrangement by said flexure.

13. The switch according to claim 9, wherein said periscope arrangement is equipped with a projection which is located between two abutments of said mount in order to limit the displacement of said periscope arrangement.

14. The switch according to claim 10, wherein said periscope arrangement is equipped with a projection which is located between two abutments of said mount in order to limit the displacement of said periscope arrangement.

15. The switch according to claim 11, wherein said periscope arrangement is equipped with a projection which is located between two abutments of said mount in order to limit the displacement of said periscope arrangement.

16. The switch according to claim 12, wherein said periscope arrangement is equipped with a projection which is located between two abutments of said mount in order to limit the displacement of said periscope arrangement.

17. The switch according to claim 1, wherein each reflective arrangement comprises:
   a periscope arrangement with an upper reflective face, a lower reflective face and an intermediate reflector; and
   an attached adjacent second periscope arrangement arranged to receive a beam reflected from said first periscope arrangement.

18. The switch according to claim 17, wherein said intermediate reflector is a partial reflector.

19. The switch according to claim 7, wherein the switch incorporates pairs of periscope arrangements; one of which is rotatable and the other one of which is fixed.

20. The switch according to claim 7, wherein the switch incorporates pairs of periscope arrangements; both of which are independently rotatable.

21. The switch according to claim 1, wherein said displaceable arrangements incorporate a first reflective arrangement with an upper and a lower reflective face which are separated by a first distance; and a second reflective arrangement with an upper and a lower reflective face which are separated by a second distance; the second distance being lower than the first distance.

22. The switch according to claim 1, wherein the input and output ports are arranged as part of a plurality of arcs with at least one arc located within an outer arc.

23. The switch according to claim 1, wherein an input port inward most extremity terminates in a first optical element which is fixed during switching and an output port inward most extremity terminates in a second optical element which is displaced by a beam steering arrangement.

24. The switch according to claim 1, wherein a number of the input ports are configured to transmit across the switch to a number of the output ports.

25. An optical switch comprising:
   a plurality of N input ports, N being greater than or equal to 3;
   a plurality of M output ports, M being greater than or equal to 2; and
   a plurality of displaceable beam steering arrangements which, during switching, displace, wherein said displaceable arrangements displace to and from positions of interception of substantially entire beams originating from said input ports and direct said beams on paths to said output ports; and
   wherein each displaceable beam steering arrangement comprises a reflective arrangement comprising a periscope arrangement; said periscope arrangement being mounted radially on a rotatable mount through a flexure; and the corresponding beam steering arrangement further comprises an actuator which causes said periscope arrangement to be radially displaceable against the resilience of said flexure.

26. The switch according to claim 25, wherein the actuator is an elongate piezo-electric actuator which is at one end secured to said mount and at its displaceable opposite end connected to said periscope arrangement by said flexure.

27. The switch according to claim 25, wherein said periscope arrangement is equipped with a projection which is located between two abutments of said mount in order to limit the displacement of said periscope arrangement.

28. An optical switch comprising:
   a plurality of N input ports, N being greater than or equal to 3;
   a plurality of M output ports, M being greater than or equal to 2; and
   a plurality of displaceable beam steering arrangements which, during switching, displace, wherein said displaceable arrangements displace to and from positions of interception of substantially entire beams originating from said input ports and direct said beams on paths to said output ports;
   wherein the input and output ports are arranged as part of a plurality of arcs with at least one arc located within an outer arc.

29. The switch according to claim 23, wherein the first and second optical elements each comprises a collimator.

* * * * *